Oct. 14, 1958  J. W. PUTT  2,856,155
ROTARY DRILLING APPARATUS

Filed July 12, 1955  6 Sheets-Sheet 1

Joseph W. Putt
INVENTOR.

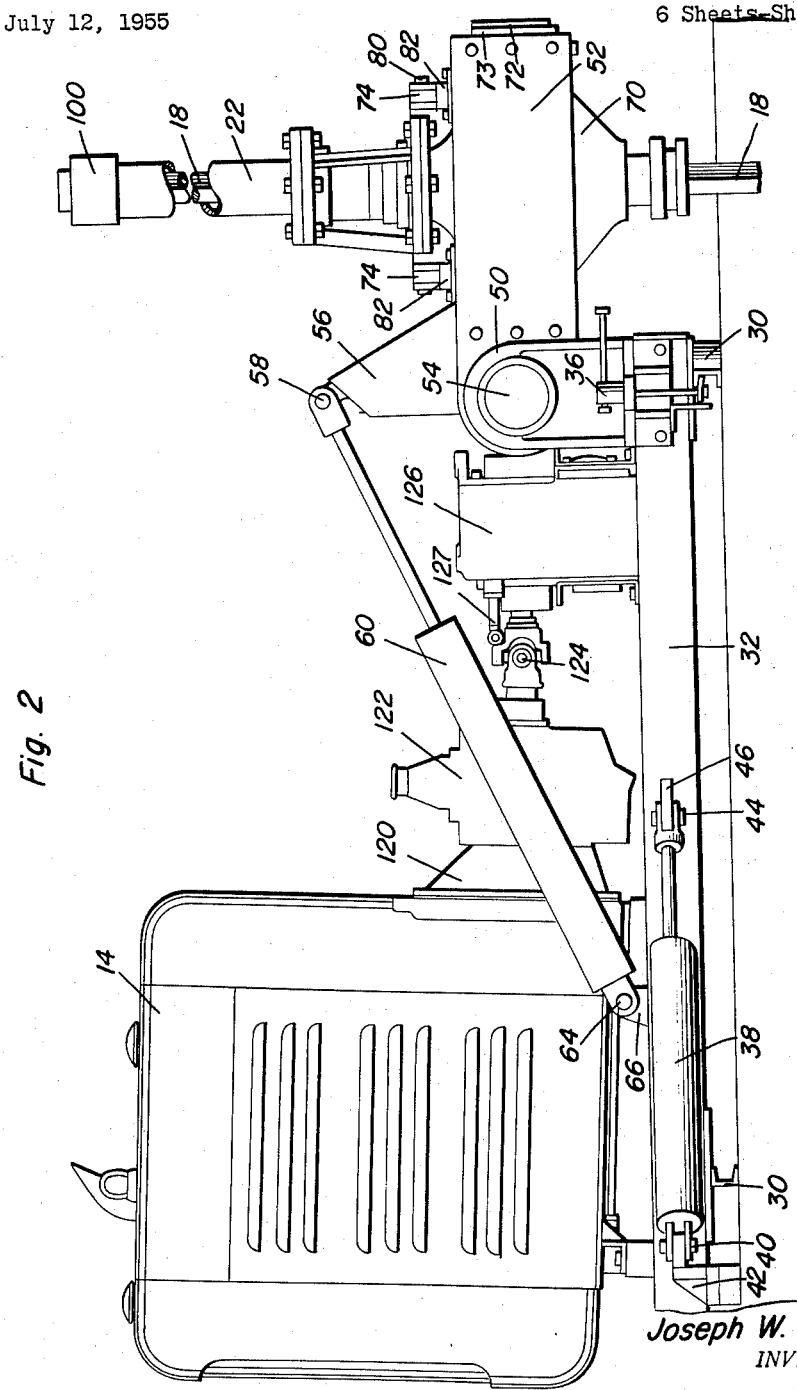

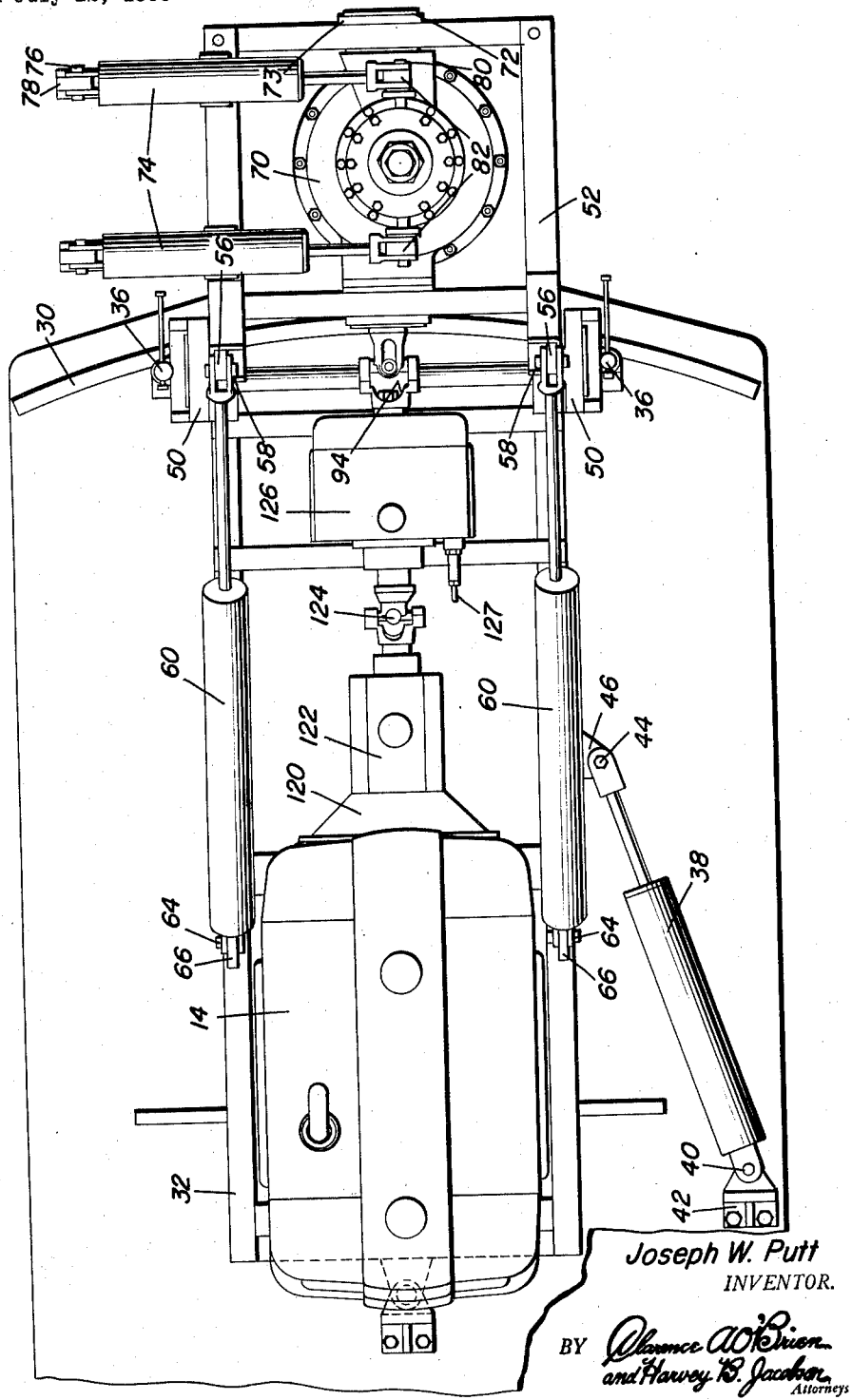

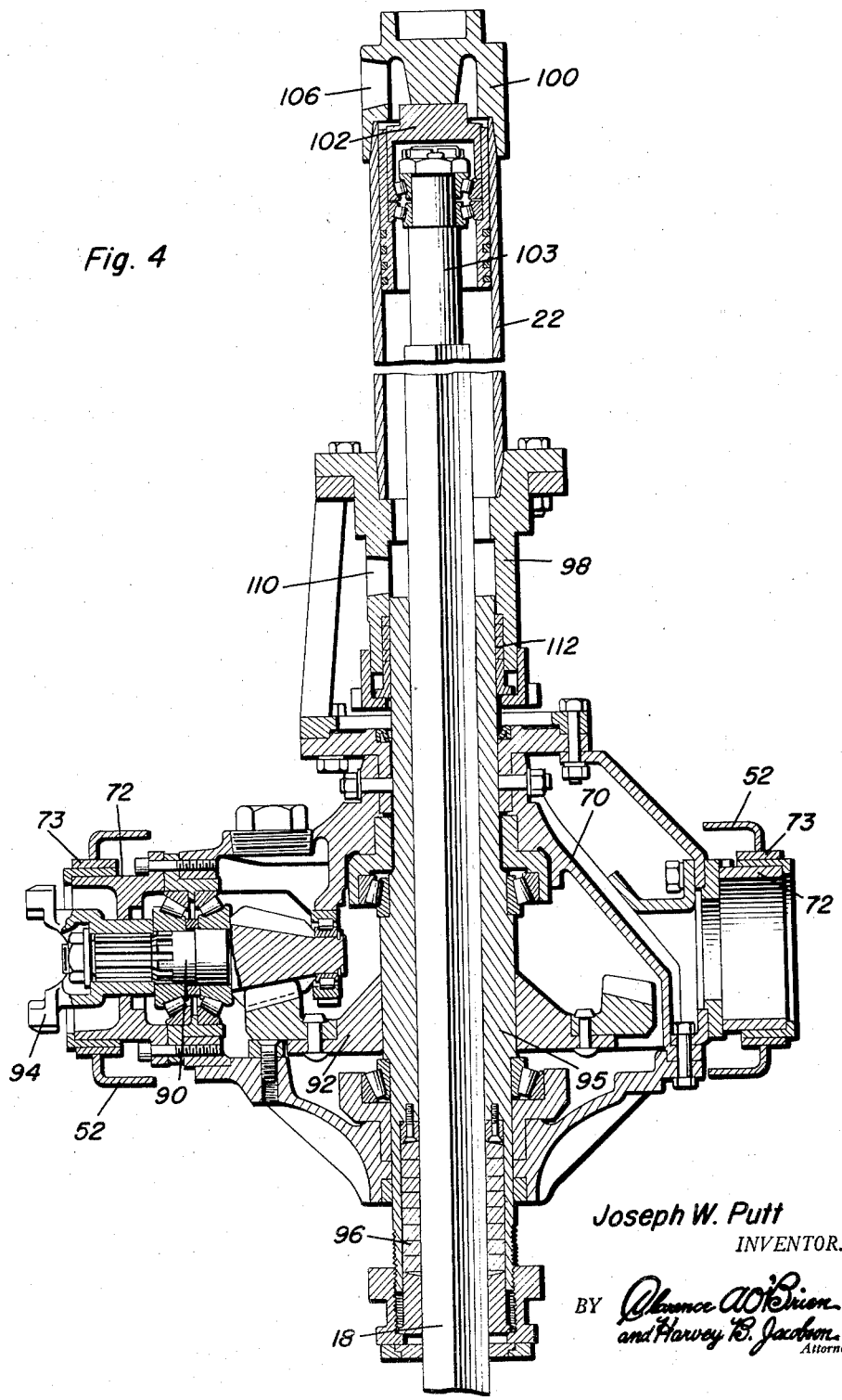

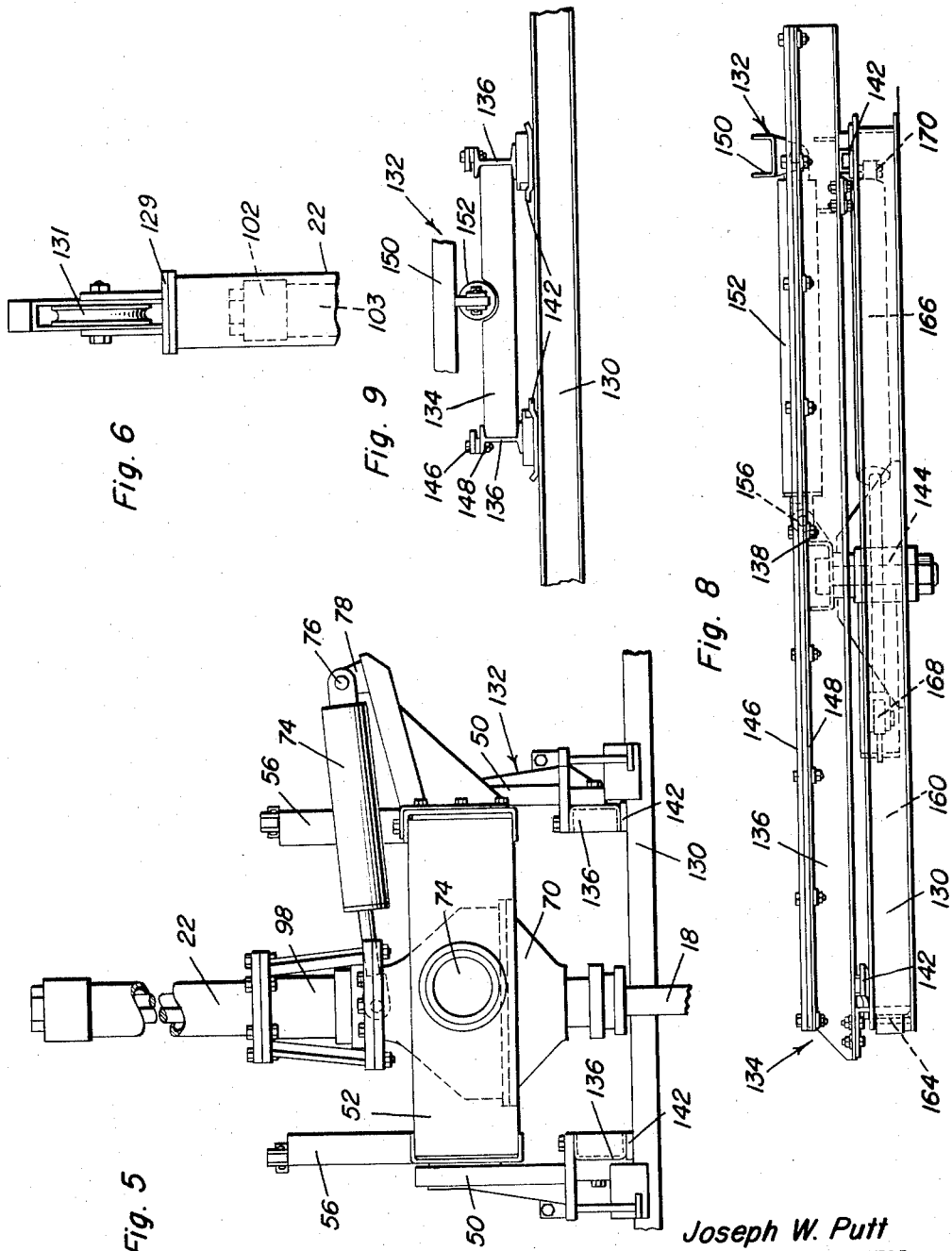

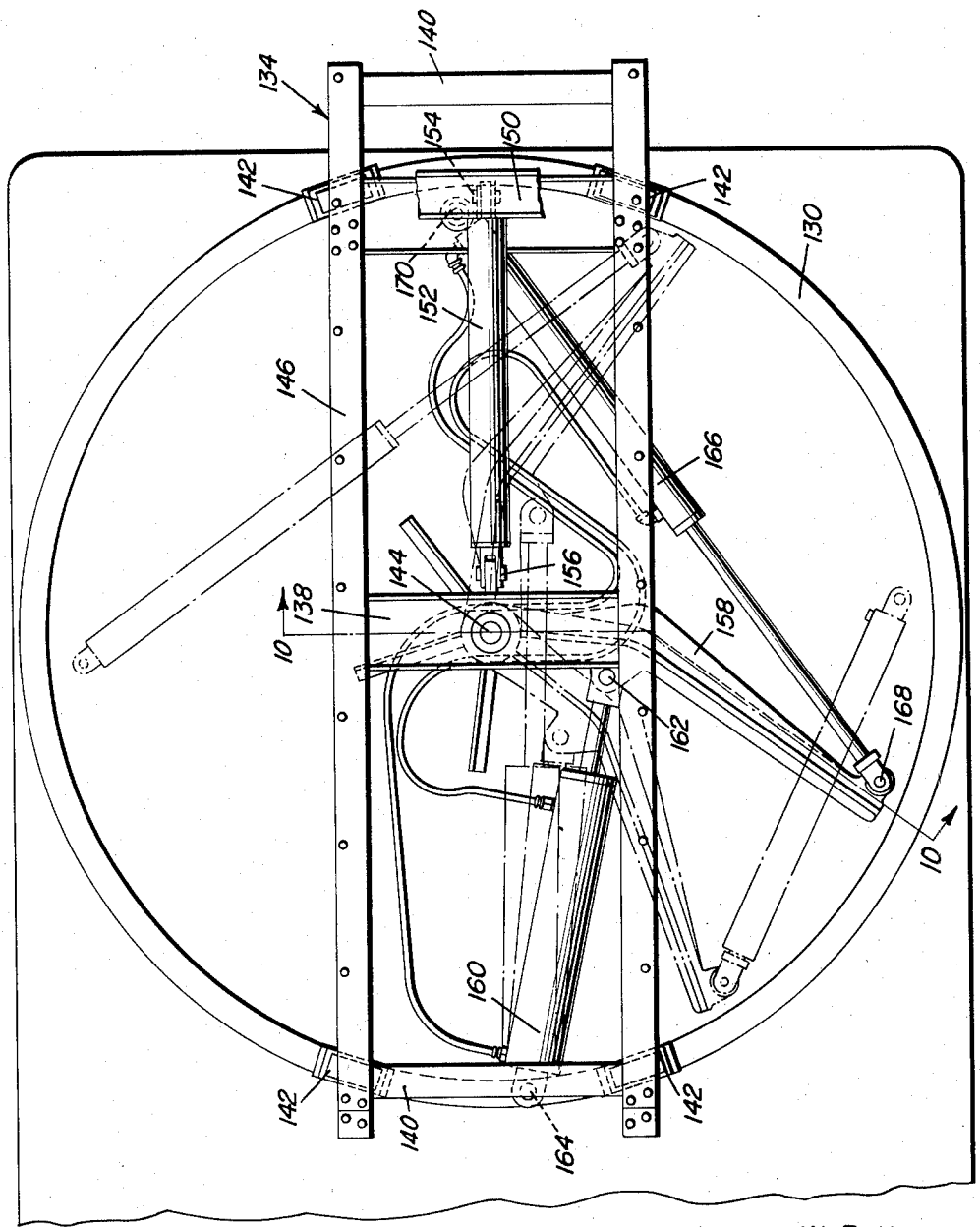

United States Patent Office 2,856,155
Patented Oct. 14, 1958

2,856,155

ROTARY DRILLING APPARATUS

Joseph W. Putt, Hamburg, Pa., assignor, by direct and mesne assignments, to Valley White Truck Company-Wyoming Valley Equipment Division, Forty Fort, Pa., a corporation of Pennsylvania Application July 12, 1955, Serial No. 521,492

7 Claims. (Cl. 255—19)

This invention comprises novel and useful improvements in rotary drilling apparatus particularly adapted for the drilling of relatively shallow bores such as post holes at various laterally adjustable and at various angular positions relative to the surface of the ground; and more specifically pertains to a unitary assembly of a power plant and a rotary drilling apparatus adapted for mounting upon a truck, whereby the apparatus and its source of power may be transported by the truck.

The principal object of this invention is to provide an improved rotary drilling apparatus which shall consist of a unitary assembly extremely mobile in nature and which shall be exceptionally maneuverable as regards positioning of its drill.

An essential object of this invention is to provide a rotary drilling apparatus wherein the advantages of hydraulic rams for positioning the apparatus are secured, together with means to amplify the range of movement of the rams.

A further object of the invention is to provide a rotary drilling apparatus which shall include provision for forcibly feeding the rotary auger into the earth by a hydraulic ram during the drilling of a bore.

A still further object of the invention is to provide an improved rotary drilling apparatus in conformity with the preceding objects together with means whereby the drilling auger may be positioned at various inclinations with respect to the vertical, and shall be capable of lateral adjusting movements with respect to its support.

Yet another object of the invention is to provide an improved rotary drilling apparatus in conformity with the preceding objects which shall employ insofar as possible conventional automotive parts with a view to facilitating its ease of construction, servicing and repair, and reducing the cost of the same.

An additional important object of the invention is to provide a mounting and an adjusting mechanism whereby a drilling mechanism and its power plant may be supported as a unitary assembly upon a truck and may be adjusted fore and aft of the truck and also may be given a horizontal swinging motion.

Yet another important object of the invention is to provide a rotary drilling apparatus in compliance with the above-mentioned objects which shall be capable of operation at different speeds in accordance with the type of drilling which is contemplated.

And a final important object of the invention to be specifically enumerated herein resides in the provision of an improved rotary drilling apparatus which may be pivoted or folded back upon the supporting truck into a lowered idle position for transportation of the same, and into various selected vertical positions for drilling operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of a portion of the unitary assembly of the power plant and the driving portion of the drilling apparatus, the latter being shown in its position during the drilling of a bore, parts being broken away;

Figure 3 is a top plan view of the drilling apparatus in the position of Figure 2, a part of the support track and parts of the apparatus being broken away;

Figure 4 is an enlarged view in vertical transverse section through the driving means of the apparatus, and also through the hydraulic ram means for causing a positive vertical movement of the auger of the apparatus, parts being broken away, the auger operating means being shown in its uppermost vertical position in readiness for the beginning of a drilling operation.

Figure 10:
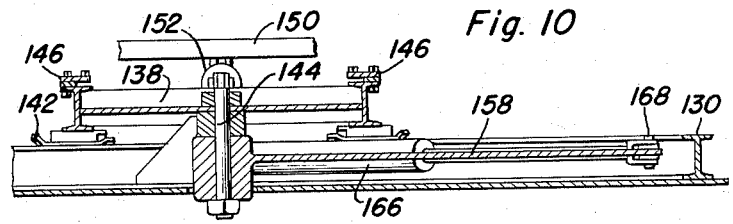

Figures 5, 7–10 pertain to a preferred modified construction of the invention wherein the drilling apparatus may be adjustable longitudinally of the truck and also may have a wide amplitude of horizontal swinging movement, in addition to being adjustably positioned in vertical planes;

Figure 5 is a rear vertical elevational view of a portion of another embodiment of drilling apparatus, parts being broken away, and showing the apparatus in position for drilling a vertical bore;

Figure 6 is a detail elevational view showing a pulley mounting which may be employed upon the top of the mast of the drilling apparatus in both embodiments of the invention disclosed herein whereby the latter will be suitable for use as a crane;

Figure 7 is a top plan view of a portion of the turntable or bed of the apparatus of Figure 5;

Figure 8 is a side elevational view of the supporting bed or turntable of Figure 7;

Figure 9 is an elevational view of Figure 8, but with the turntable and carriage being rotated at 90° upon the track and shown in end elevation; and, Figure 10 is a detail view taken in vertical transverse section substantially upon the plane indicated by the broken section line 10—10 of Figure 7.

Referring now specifically to the accompanying drawings, attention is directed first to the more simplified embodiment of Figures 1–4 and 6, wherein there is disclosed generally by the numeral 10 a unitary assembly constituting the improved rotary drilling apparatus in accordance with one embodiment of this invention, the same being mounted upon any conventional form of truck 12 whereby mobility is imparted to the apparatus. The unitary assembly includes a power plant 14 which may be an internal combustion engine of any conventional type together with an earth boring auger 16 carried by a square auger stem 18 to which rotation is imparted and to which various positional adjustments are made through a driving assembly and an adjustable support indicated generally by the numeral 20. The apparatus further includes a vertical mast or a standard 22 which constitutes a hydraulic means for imparting positive vertical movement to the auger during the drilling operation.

In the two embodiments of the invention illustrated in the drawings as disclosing a satisfactory mode of practicing this invention, there is included a turntable or bed construction on which the entire drilling unit is mounted for a rotative or traversing movement in a horizontal plane for selectively positioning the drilling auger; a driving means for imparting rotation to the drilling auger; a hydraulic raising and lowering means for the drilling auger; and an inclination controlling means for the auger. These elements are sub-assemblies of the general organization and will now be described in detail.

Turntable or bed construction

Figure 1:
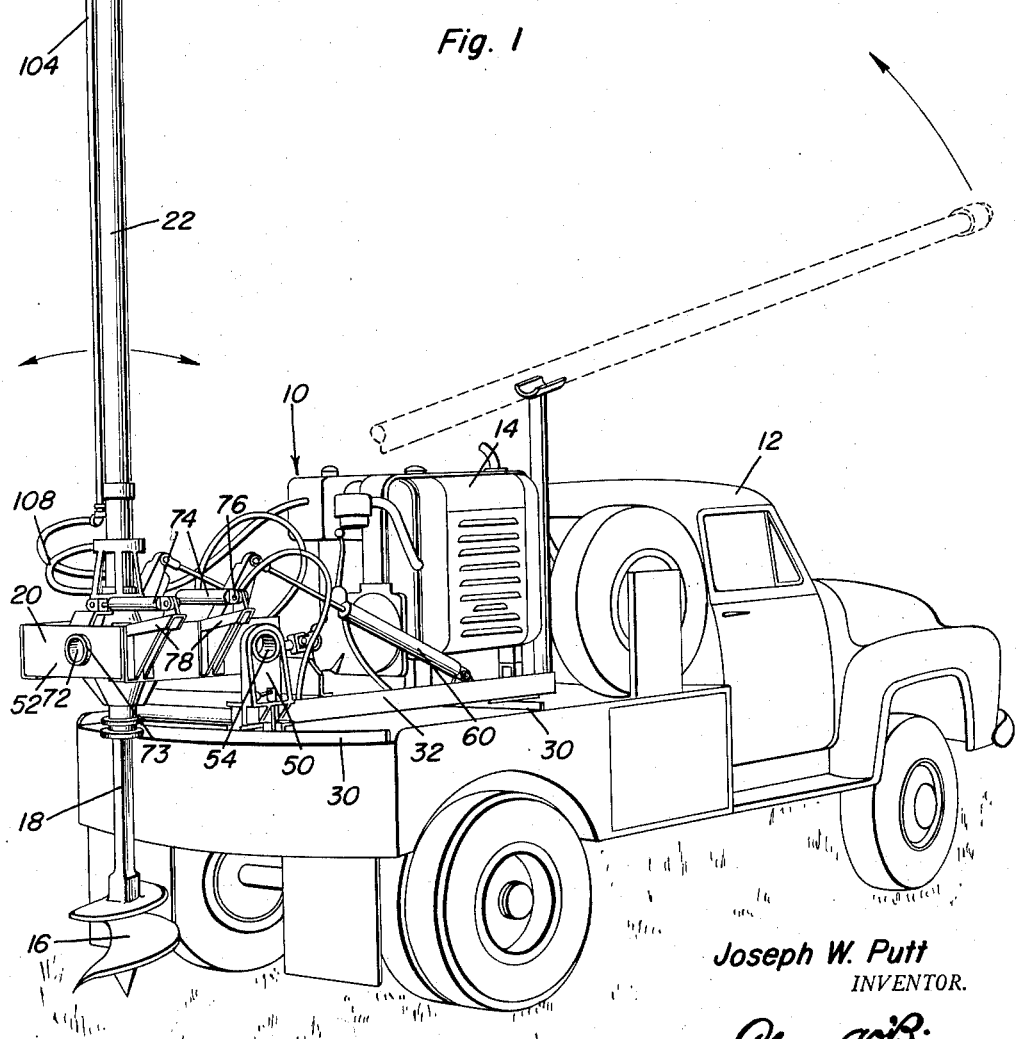
Figure 1 is a perspective view showing a preferred embodiment of the portable and adjustable rotary drilling apparatus in accordance with this invention, the apparatus being shown in full lines in vertical position for drilling a bore, and in dotted lines in the lowered position of the apparatus for transportation purposes, the arrows indicating the directions of such movements.

Referring especially to Figure 3 it will be seen that the turntable or bed assembly consists of a stationary circular or arcuate track 30, a portion only of which is shown and which may conveniently be of channel construction, as shown Figure 2, and which is mounted in any desired manner upon the chassis of the truck 12. In some instances, this track may be in the form of a complete circle as shown in the hereinafter described embodiment of Figures 5, 7–10, while in other instances it may be formed as two arcs of a circle as illustrated in Figure 1.

Mounted upon the track 30 for rotary or swinging movement in a horizontal plane is a turnable or carriage assembly indicated generally by the numeral 32. Upon this carriage assembly is mounted, for unitary movement therewith, the various elements previously enumerated and making up the drilling organization and the means for supplying power thereto. The carriage is secured to and movable upon the track and any conventional and suitable clamping means indicated generally by the numeral 36 are provided whereby the carriage may be clamped in rotationally adjusted position upon the track.

A rotary traversing or horizontal swinging movement is imparted to the carriage for turning the same upon the track 30, and such means, see Figures 2 and 3, preferably comprises a double-acting hydraulic cylinder and piston unit or ram 38 of any conventional design, this unit being pivotally connected as at 40 to a lug 42 which is stationarily mounted in any desired manner upon the chassis of the truck and also is pivotally connected as at 44 to a lug 46 which is mounted upon the carriage assembly 32. A fluid medium under pressure, from any desired source, not shown, is supplied selectively to opposite ends of the hydraulic cylinder of the unit 38 in any desired manner in order to selectively elongate or shorten the hydraulic cylinder unit and thereby cause rotation of the carriage assembly in either direction upon the track, thus causing a horizontal traversing movement of the drilling assembly.

The drill and its driving means

Referring especially to Figures 2 and 3 it will be seen that rising from the outer or rearward end of the carriage 32 and from the opposite sides thereof is a pair of parallel supporting standards 50. A supporting frame 52 is journalled at its inner or forward end as by trunnions 54 in the standards 50 whereby the supporting frame is mounted for vertical swinging movement about a horizontal axis extending through the trunnions and located above the carriage 32. As shown in Figures 2 and 3, in order to effect such tilting or vertical swinging movement, a pair of upstanding lever arms or lugs 56 are secured to the supporting frame 52 and are pivotally connected at 58 to one end of cylinder and piston assemblies or rams 60 whose other ends are pivoted at 64 to lugs 66 mounted upon the carriage 32. By suitable fluid pressure connections, not shown, the cylinders 60 may be actuated to cause vertical tilting movement of the supporting frame assembly 52 about the trunnions 54, as for example when moving the mast 22 between the vertical operative position shown in solid lines in Figure 1, and the inclined idle position shown in dotted lines therein, or various desired vertically inclined positions therebetween for drilling operations. Thus, the drilling assembly carried by the supporting frame 52 can be swung about the horizontal axis through the trunnions 54 and in a vertical plane extending longitudinally of the carriage assembly 32.

The drilling assembly is journalled in the supporting frame 52 for vertical tilting movement about an axis lying in the same horizontal plane with, but at right angles to the axis of the trunnions 54. Thus, a gear casing 70, as shown clearly in Figures 3 and 4, is provided with trunnions or stub axles 72 which are journalled in bearings 73 in the supporting frame 52. It will thus be seen that the gear casing is independently and jointly tiltable in two vertical planes about two perpendicularly disposed axes in the same horizontal plane, these axes being those of the trunnions 54 and those of the stub axles 72.

In order to impart tilting motion to the gear casing 70 about the horizontal axis through the stub axles 72, there are provided a pair of hydraulic cylinder units or rams 74, each of which, is pivotally connected as at 76 to a support member 78 carried by the supporting frame 52 at one side thereof, as shown in Figure 1, and by pivots 80 to lugs 82 carried by the gear casing 70. Suitable fluid pressure supply means are employed to selectively actuate the cylinder and piston units 74 to impart a tilting movement about the horizontal axis through the stub axles 72, independently of the tilting movement impartable by the rams 60 about the horizontal axis through the trunnions 54.

In the interest of economy and ease of servicing or repair, the gear casing 70 may consist of a conventional differential assembly such as that of conventional motor trucks. Since the details of such automotive differential assemblies are in themselves well-known, and the illustration in Figure 4 is that of a conventional, well-known assembly now purchasable upon the open market, a detailed description of the same is deemed to be unnecessary. In general, however, see Figure 4, a shaft 90 constituting a power input shaft is operatively connected to a ring gear assembly 92 for driving the same, rotation being imparted to the shaft 90 as by a universal joint coupling 94 in a manner to be later set forth. Journalled in the gear casing and secured to the ring gear assembly 92 for rotation therewith is a hollow sleeve or member 95 which extends through the upper and lower ends of the casing. At what may be termed its lower end, the sleeve 95 is provided with an axial cavity and with a suitable oil tight internally disposed packing assembly 96 through which slidably extends the stem 18 of the drill auger 16. As shown clearly in Figure 1, this stem is preferably square or non-circular in cross-section and the internal cross sectional area of the sleeve 95 is of a similar shape whereby rotation of the sleeve may be employed to rotate the auger stem, but whereby sliding movement of the auger stem through the sleeve is permitted for a purpose to be now set forth.

Secured to and extending from what may be termed the upper end of the gear casing assembly 70, as by a detachably secured mounting sleeve assembly 98, is the hollow mast or cylinder 22 into which extends the stem 18.

The mast 22 constitutes the cylinder unit of a hydraulic cylinder assembly, and is provided with a cylinder head 100. A piston 102 is rotatably secured to the cylindrical diametrically reduced upper end portion 103 of the auger stem 18 and by means of a fluid conduit 104, see Figure 1, which communicates through a port 106 in the upper cylinder head 100, fluid pressure may be applied at the top of the piston 102 for forcing the latter downwardly and since the piston is carried by the upper end of the auger stem, the auger stem and auger will likewise be forced downwardly. A similar fluid pressure conduit 108 is connected as by a port 110 in the mounting sleeve assembly 98 for applying fluid pressure to the open lower end of the mast 22 and thus to the underside of the piston for driving the same upwardly and thereby lifting the auger.

It is to be understood that fluid pressure may be selectively applied to either end of the cylinder formed by the mast 22 in any desired manner. The hydraulic cylinder and piston action of the mast thus provides a means whereby as the auger is rotated by the power input shaft 90, the auger may be forced by hydraulic pressure downwardly into the soil to facilitate the drilling operation; and upon completion of the drilling operation may be lifted out of the bore.

It will be observed that the cylinder assembly 98 is provided with a suitable packing means 112 cooperating with the upper end of the sleeve 95 for preventing escape of the pressure fluid from the interior of the mast 22 at the lower end of the same.

Referring now to Figures 1–3, it will be seen that power is provided by the power plant 14, being transmitted thereby through a conventional automobile clutch assembly 120, transmission assembly 122, and a universal joint assembly 124 to a second transmission assembly 126, having a two-speed shift control rod 127, and from thence by means of the previously mentioned universal joint assembly 94 and power input shaft 90 into the gear casing 70 for rotating the sleeve 95 and the auger stem 18. The clutch assembly and transmission assemblies are preferably of a conventional type now employed in automotive vehicles to thereby reduce the cost of the elements of this organization as well as to facilitate servicing and repairing of the same. The two transmission assemblies provide for various speeds of operation of the auger stem as may be found desirable for drilling at different speeds and with different power through different types of formations.

In some instances, it may be desirable to utilize the mast 22 as a crane. For that purpose, as shown in Figure 6, there may be mounted in place of the head 100 previously mentioned, a head or cap 129 which serves as a block for a pulley 131. A cable may be entrained over this pulley and operated from any suitable power source as a conventional crane, the mast serving thus the dual function of causing vertical movement of the auger stem and functioning as a part of the crane. Thus, by rotating the carriage 32 upon the track 30 by the ram 38 and/or by tilting the gear casing 70 by the rams 60 or 74 about its trunnions 54 and 72, the mast can be disposed at various positions as desired for its employment as a crane.

*Embodiment of Figures 5, 7–10*

In the embodiment of Figures 1–4, the carriage 32 could be swung horizontally upon the arcuate track 30 whereby the drilling apparatus overhanging the rear end of the same could be positioned directly to the rear or to either side of the rear of the truck. In addition, the rams enabled the axis of the drill to be tilted laterally or longitudinally of the carriage, or both whereby the drill could be positioned at any desired angle to the vertical.

In addition to these operations, the generally preferable embodiment of Figures 5, 7–10 enables the entire apparatus to be rotated or swung horizontally throughout a much greater range of movement to thereby position the drill throughout an arc of about 220° extending horizontally from one side of the truck to the other; and also enables a radial movement of the apparatus from its center of horizontal swinging movement.

A stationary circular track 130 is mounted fixedly upon the truck in the same manner as the track 30 of the embodiment of Figures 1–4 and a carriage 132 is provided which supports the drilling apparatus and its driving means of the same construction as described and illustrated in the preceding embodiment. In the present arrangement, the carriage 132 is movably and adjustably mounted upon the track 130 by a turntable construction 134 to be now described.

The turntable 134 comprises a pair of parallel tracks or rails 136 which comprise I-beam or H-beam structural elements. A central frame cross member 138 together with end cross members 140 extend between the rails 136 to establish a rigid turntable assembly. The bottoms of the rails 136 are preferably provided with slides or shoes 142 or other elements for slidingly engaging the tracks 130.

A vertical spindle 144 is secured in any desired manner to the truck bed at the center of the track 130 and the mid-portion of the cross head 138 is mounted upon the spindle, whereby the turntable is constrained to rotate horizontally about the vertical axis of the spindle 144 and upon the track.

Referring especially to Figures 8 and 9 it will be observed that the rails 136 of the turntable have at their upper portions upper and lower horizontal, laterally inwardly projecting, flanges or guide plates 146 and 148 forming a part of or secured to the upper flanged portion of the rails 136, and these guide plates constitute a slide for receiving cooperating members, not shown, of the carriage 132. The carriage includes a frame cross member 150 and a fluid pressure operated cylinder and piston assembly or ram 152 which effects sliding movement of the carriage upon the turntable.

Thus, the ram is pivoted to the cross member 150 of the carriage as by the pivotal connection 154 and to the cross member 138 of the turntable as by the pivotal connection 156. Upon actuation of the ram 152, the carriage will be moved to and fro upon the rails 136 of the turntable and can also be independently given a horizontal movement by rotation of the turntable about the axis of the spindle 144.

In order to secure an amplitude of horizontal swinging of the carriage and turntable throughout a circumferential extent of about 220° and also to realize the advantage of positive control afforded by a hydraulic ram, a motion amplifying actuating mechanism is provided. A lever 158 is journaled at one end for rotation about the spindle 144, below the turntable 134. A fluid pressure operated cylinder and piston unit or ram 160 is pivoted as at 162 to an intermediate portion of the lever for effecting arcuate motion thereof, and has its other end pivoted at 164 to a stationary member as a portion of the track 130. Upon actuation of the ram 160 by a suitable fluid pressure control means, controlled arcuate horizontal swinging of the lever 158 between the dotted line positions of Figure 7 can be obtained.

A further, amplifying fluid pressure cylinder and piston unit or ram 166 is provided which is pivotally attached as at 168 to the outer end of the lever 158 and at 170 to a portion of the turntable. It will thus be apparent that an additional arcuate horizontal movement can be given to the turntable and carriage, in either direction, relative to the motion effected by the ram and lever 160 and 158, as will be apparent from Figure 7. It is contemplated that the rams 166 and 160 can be used independently or simultaneously; and in the same or opposite directions in order to facilitate the placing of the turntable at selected horizontally adjusted positions.

The drilling apparatus and its power plant and driving mechanism may be identical with that disclosed in the embodiment of Figures 1–4, consequently, the same numerals designate the same elements and further reference thereto is deemed to be unnecessary. In applying or mounting the gear case 70 previously described in connection with Figures 1—4 upon the turntable, carriage and track of the modification of Figures 5, 7–10, it will be understood that the standards 50, which pivotally support by the trunnions 54 and the frame 52 in which the gear case 70 is mounted, will be carried by the side frame members (not shown) of the carriage 132 in exactly the same manner as they are shown and described in connection with the side frame members of the carriage 32 in Figure 2. Similarly, the same actuating rams 60 will be employed to connect the carriage 132 and the brackets 56 on the frame 52 as shown in Figure 2 to effect tilting of the frame 52 upon the carriage 32.

The difference of structure and operation of the embodiment of Figures 5, 7–10 resides therefore in the interposition of a turntable between the carriage and the track, the longitudinal travel of the carriage upon the turntable by means of the ram 152, and the use of the lever 158 with the pair of rams 160 and 166 to effect horizontal swinging movement of the turntable.

From a comparison of Figure 10 with Figures 7 and 8 it will be understood that the vertical spindle 144 is secured to the truck bed and receives a number of members thereon.

The lever 158 is journaled at its inner end or hub upon the spindle for horizontal swinging movement in response to actuation of the fluid pressure cylinder 160.

The central cross member 138 of the frame of the turntable 134 is likewise journaled on the spindle 144 for horizontal swinging movement thereon in response to actuation of either or both of the fluid pressure cylinders 160 and 166.

As shown in Figure 10, a stationary spacer collar is disposed upon the spindle 144 to separate or space the lever 158 and the cross member 138, and a stationary retainer member on the spindle overlies the cross member 138.

Referring to Figure 7, it will be noted that the pivotal connection 168 by which the fluid pressure actuated cylinder 166 is pivoted to the lever 158 is located proximate the track 130 while the connection 170 which pivots the unit 166 to the turntable is located proximate the track 130 but spaced about 90° from the connection 168.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary earth drilling apparatus comprising a supporting frame, means mounting said supporting frame for tilting about a generally horizontal axis, a gear case mounted in said frame for tilting about a transverse axis which is perpendicular to and in the same plane with said horizontal axis, a drill having a stem mounted in said gear case for axial sliding and for rotary movement, means for imparting rotation to said drill stem, means for causing axial movement of said drill stem, means for tilting said supporting frame, means for tilting said gear case in said supporting frame, a carriage upon which said supporting frame is mounted, a power plant operatively connected to said rotation imparting means and mounted on said carriage, a circular track supporting said carriage for horizontal swinging movement, means causing horizontal swinging movement of said carriage upon said track.

2. The combination of claim 1 including means for locking said carriage in horizontally adjusted position upon said track.

3. A rotary earth drilling apparatus comprising a supporting bed including a circular track, a carriage supporting thereon as a unitary assembly a drilling apparatus and a driving means therefor, means for mounting said carriage upon said track for horizontal swinging movement thereon, a turntable mounted upon said track for horizontal swinging movement thereon, means journaling said turntable for rotation about a vertical axis, said turntable having parallel rails, said carriage being mounted upon said rails for movement longitudinally of the rails and radially of the circular track, hydraulically actuated means lying entirely within the confines of the track and operatively connected to the latter and to said carriage for causing horizontal swinging thereof.

4. The combination of claim 3 including a fluid pressure actuated ram connected to the carriage and to a portion of the turntable for causing movement of said carriage longitudinally of said rails.

5. The combination of claim 3 wherein said last mentioned means includes a fluid pressure actuated ram and means operatively connecting said ram to the turntable and said bed for causing horizontal swinging of the turntable, said connecting means including a motion amplifying means for increasing the effective motion of the turntable in response to actuation of said ram.

6. The combination of claim 3 wherein said last mentioned means includes a fluid pressure actuated ram and means operatively connecting said ram to the turntable and said bed for causing horizontal swinging of the turntable, said connecting means including a lever pivoted for arcuate movement, said ram being connected to said lever adjacent its pivot, means for imparting additional movement to the turntable and connected to the turntable and to the lever remote from its pivot.

7. The combination of claim 6 wherein said last means comprises an additional fluid pressure actuated ram.

References Cited in the file of this patent
UNITED STATES PATENTS

| | | |
|---|---|---|
| 1,375,640 | Moore | Apr. 19, 1921 |
| 1,397,324 | Moore | Nov. 15, 1921 |
| 1,571,077 | Washa | Jan. 26, 1926 |
| 2,415,572 | Jaques | Feb. 11, 1947 |
| 2,528,588 | Forslund | Nov. 7, 1950 |
| 2,665,116 | Brink et al. | Jan. 5, 1954 |